(12) United States Patent
Nelson

(10) Patent No.: US 6,170,799 B1
(45) Date of Patent: Jan. 9, 2001

(54) TEMPERATURE LOCK STOP FOR FAUCETS

(75) Inventor: Alfred C. Nelson, Carmel, IN (US)

(73) Assignee: Masco Corporation of Indiana, Taylor, MI (US)

( * ) Notice: Under 35 U.S.C. 154(b), the term of this patent shall be extended for 0 days.

(21) Appl. No.: 09/342,806

(22) Filed: Jun. 29, 1999

(51) Int. Cl.[7] .................................................. F16K 35/02
(52) U.S. Cl. ............................................................ 251/96
(58) Field of Search ................................ 251/96, 95, 89, 251/292, 105, 104, 102, 101; 137/625.41

(56) References Cited

U.S. PATENT DOCUMENTS

| 1,089,098 | * | 3/1914 | Winkler | 251/96 |
|---|---|---|---|---|
| 2,829,538 | * | 4/1958 | Mueller | 251/96 |
| 4,475,573 | * | 10/1984 | Hindman | 137/624.41 |
| 4,577,831 | * | 3/1986 | DiBartolo | 251/95 |
| 4,813,455 | * | 3/1989 | Iqbal | 137/625.17 |
| 5,039,062 | * | 8/1991 | England et al. | 251/95 |
| 5,513,831 | * | 5/1996 | Seward | 251/96 |
| 5,551,124 | * | 9/1996 | Zeringue | 251/96 |
| 5,671,904 | * | 9/1997 | Minutillo | 251/96 |

* cited by examiner

Primary Examiner—Kevin Shaver
Assistant Examiner—Eric Keasel
(74) Attorney, Agent, or Firm—Reising, Ethington, Barnes, Kisselle, Learman & McCulloch, P.C.

(57) ABSTRACT

A water mixing valve (10) can selectively adjust temperature by selection mixing of the hot and cold water supplies and be selectively locked in place by a knob (26) fastened via a threaded faster (30). The knob (26) has a spline section (34) seated in a complementary spline section (36) in the valve body (20) to prevent the knob (26) and operating stem (22) from inadvertent rotation.

7 Claims, 2 Drawing Sheets

TEMPERATURE LOCK STOP FOR FAUCETS

TECHNICAL FIELD

The field of this invention relates to a temperature mixing valve for mixing hot and cold water supplies and more particularly to a lock stop for locking the set mix of water.

BACKGROUND OF THE DISCLOSURE

Many mixing valves have a control stem mounted to an operable handle that controls the mix of hot and cold water to the outlet port in a faucet. Often the control stem that controls the temperature mix is separate from the flow rate control portion of the faucet. As such, the temperature-mixing device can be located significantly upstream and removed from the flow rate control valve and the spout or final outlet port. Remote mixing valves are often used in conjunction with a bank of electronic faucets which turn on and off by sensing the presence of a persons hands or body. The electronic sensing device controls the on-off position and the flow rate of the valve but often does not control the mix of the hot and cold water. The hot and cold water supplies are premixed to a desired temperature upstream.

As such, the temperature-mixing valve is often concealed to prevent the casual user or unauthorized person from tampering with or inadvertently changing the temperature mix. While many of these mixing valves may be behind closed doors and remote from the faucet, they still have freely accessible handles, which may be easily and inadvertently changed.

What is needed is a temperature-mixing valve with a knob that can be easily locked in place to prevent casual tampering or inadvertent adjustment but can be readily released with a special tool to provide adjustment to the desired temperature.

SUMMARY OF THE DISCLOSURE

In accordance with one aspect of the invention, a rotatable handle assembly for a mixing valve includes a first stem member operably connected to a mixing valve element. The stem member is rotatably mounted onto a mixing valve body for operating the mixing valve element to adjust the mixed hot and cold water supplies. The stem extends outside of the valve body. A manually operable knob is mounted onto the stem and is rotationally affixed with the stem. The knob is axially movable between a first lock down position and an operable adjusting position. The knob has a splined section fitted with a complementary splined section of the valve body when in the lock down position to prevent the stem from rotation with respect to the valve body. A releasable fastener affixed the knob to the stem in the first lock down position Preferably, the spline section of the valve body is a formed female socket section surrounding the stem and the spline section of the knob is at a proximate axial end of the knob. At least one of the spline sections of the knob and valve body are chamfered to provide automatic meshing of the two spline sections as the knob is axially moved to the lock down position.

The fastener can be loosened to allow the knob to axially slide on the stem to the adjustable position. When in the adjustable position, the splined section of the knob is disengaged from the splined section of the valve body to allow the knob and stem to rotate to a desired mix position.

A spring element is preferably interposed between the knob and the valve body to bias the knob to the adjustable position. The fastener, when tightened, moves the knob against the bias of the spring to the lock down position. Preferably the fastener is fastened through a distal axial ends of the knob and the stem.

It is desirable that the fastener is a threaded fastener with a head having an allen wrench receptacle and is recess mounted in the distal end of the knob. It is also desirable that the knob has a narrow contour to deter casual or inadvertent manipulation but has external ribs for promoting manual grasping of the handle for ease of deliberate rotation.

BRIEF DESCRIPTION OF THE DRAWINGS

Reference now is made to the accompanying drawings in which.

DETAILED DESCRIPTION OF THE PREFERRED EMBODIMENT

Figure 1:
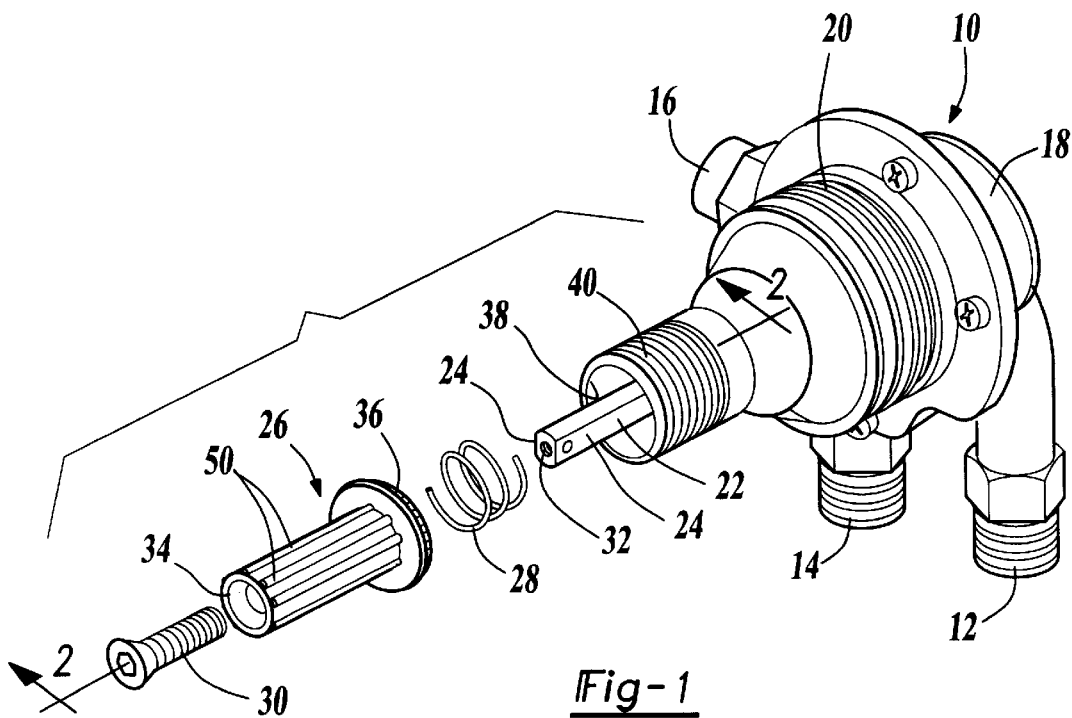
FIG. 1 is a perspective and exploded view of a mixing valve incorporating a lock stop handle assembly in accordance with one embodiment of the invention.

Referring now to FIG. 1, a commercially available temperature mixing valve 10 has a cold water inlet 12, hot water inlet 14, and mixed water outlet 16 in a base fixture 18. A conventional pressure balance proportioning valve and mixing valve element (not shown) are operably housed within the mixing valve body 20 that is secured to the base fixture 18. The body 20 has a rotatable valve stem 22 extending therefrom. The valve stem 22 is operably connected to the mixing valve element and is rotatable to adjust the mix of cold and hot water from the inlets 12 and 14 to outlet 16.

Figure 5:
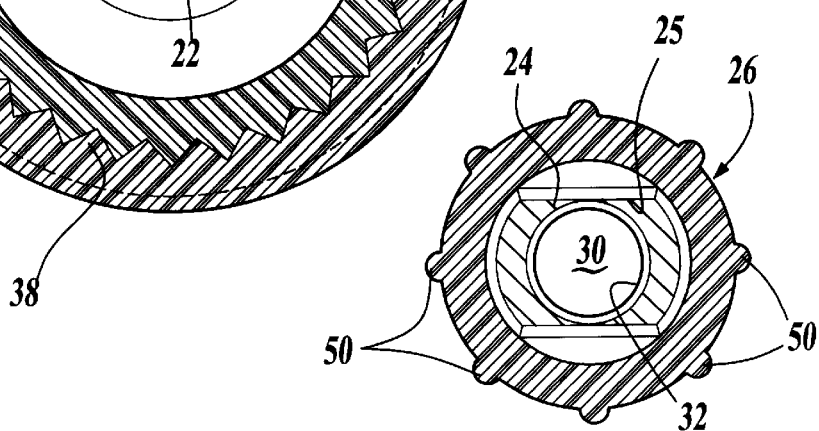
FIG. 5 is a cross-sectional view of the control knob illustrating the knob mounted onto the stem taken along lines 5—5 shown in FIG. 3.

The stem 22 has two flats 24 such that the stem 22 can be non-rotatably connected to a knob 26 through its complementary shaped central aperture 25, as illustrated in FIG. 5. The knob is spring biased by a spring 28 away from the valve body 20. A threaded fastener 30 affixes the knob to the stem through the distal ends 32 and 34 of the respective stem and knob.

Figure 2:
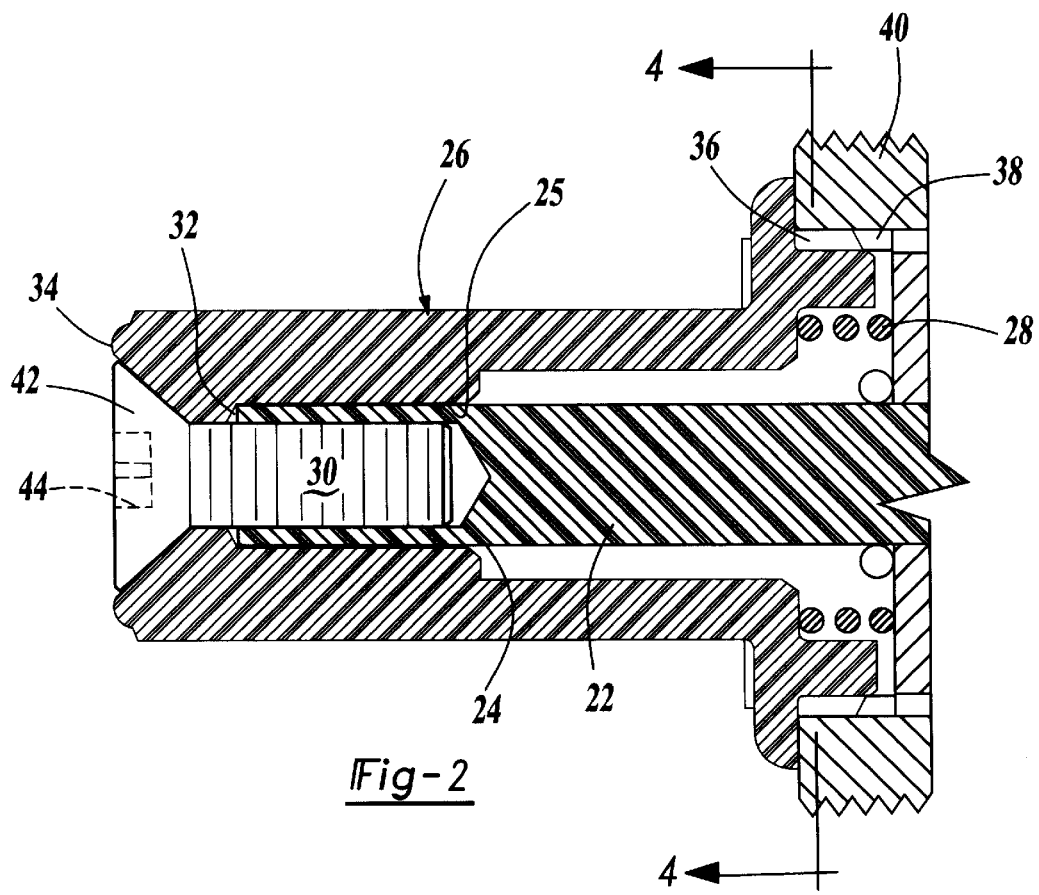
FIG. 2 is cross-sectional fragmentary view of the handle assembly taken along lines 2—2 shown in FIG. 1 with the handle assembly in the lock down position.
Figure 4:
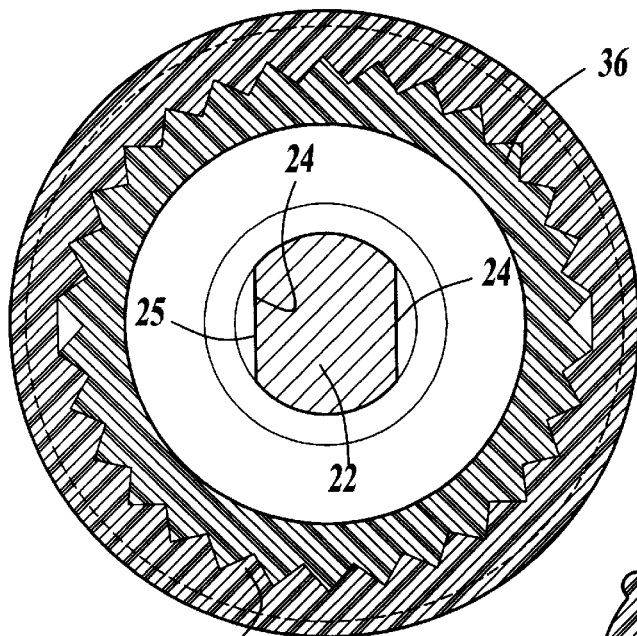
FIG. 4 is a cross sectional view taken along lines 4—4 shown in FIG. 2.

Referring now to FIG. 2, when the fastener 30 is fully tightened, the knob 26 is pushed against the spring bias of spring 28. The knob has its proximate spline section 36 seated in a spline section 38 of the valve body in socket 40 surrounding the stem 22. Both spline sections 36 and 38 are fully circular and fully surround stem 22. The respective spline sections 36 and 38 when engaged to each other prevent the knob 26 and the stem 22 from any rotation, as illustrated in FIG. 4. As such the position of the stem 22 is fixed and not adjustable. As such, this lock down position of the fastener 30 and knob 25 prevent casual tampering with the stem 22 and inadvertent adjustment of the mixed water proportions set by the mixing valve 10.

To further deny the casual tampering with the position of the mixing valve stem, the fastener 30, when fully tightened, has its head 42 recessed within the distal end 34 of the knob. The head 42 further has an allen wrench type recess 44 therein. As such, the fastener is inaccessible to the casual user unless an allen wrench is used.

Figure 3:
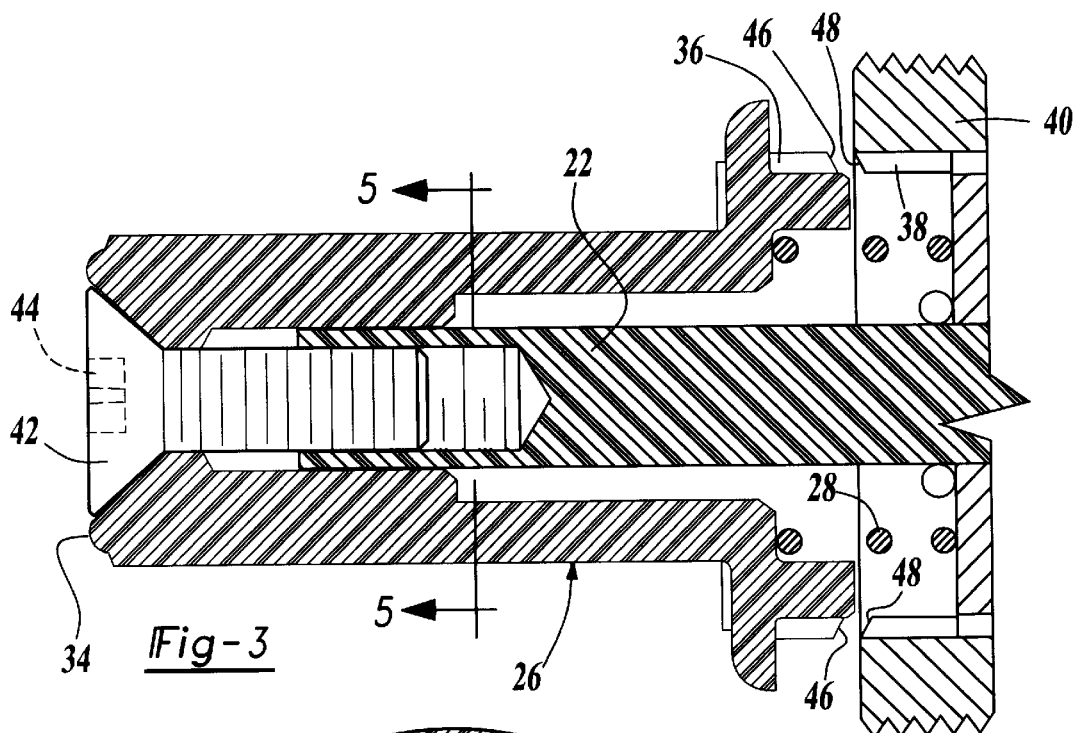
FIG. 3 is a view similar to FIG. 2 with the handle assembly shown in the adjustable position.

However, initial setting and later adjustment of the mixing valve temperature is readily possible. The threaded fastener can be loosened with the appropriate allen wrench. As the fastener is loosened, it moves on its threads and allows the knob 26 to move to the adjustable position shown in FIG. 3. In this position, the spline sections 36 and 38 are disengaged and the knob is free to rotate with the stem 22 to adjust the temperature mix of the water.

The knob 26 has a narrow profile about stem 22 to deter casual or in advertent grasping thereof and to give a visual indication that the knob 26 is not the kind that is freely or commonly adjustable. However, the knob 26 has handle-facilitating ribs 50 on its outer side to promote deliberate manual rotation thereof. The knob 26 if desired can have a textured outer surface or have laterally extending external levers, or other embossments to further facilitate manual turning.

When the appropriate setting or adjustment is made, the fastener 30 is re-tightened and the spline sections 36 and 38 are reseated with each other. Each spline section has a chamfered or canted end 46 and 48 to provide automatic seating of the two spline sections 36 and 38 as the knob 26 is seated into the socket section 40. The spline 36 and 38 are narrow enough to provide for seating about multiple positions such as 20 different positions so that the temperature adjustment increments are relatively small i.e. increments as small as 2° F.

In this fashion, the temperature-mixing valve allows for adjustment of the water temperature by an authorized or deliberate action but deters inadvertent adjustments or casual tampering of the temperature mix.

Variations and modifications are possible without departing from the scope and spirit of the present invention as defined by the appended claims.

The embodiments in which an exclusive property or privilege is claimed are defined as follows:

1. A rotatable handle assembly for a water mixing valve characterized by:
    a first stem member operably connected to a mixing valve element and rotatably mounted onto a mixing valve body and extending therefrom;
    a manually operable knob mounted onto said stem for rotation therewith;
    said knob being affixed to said stem by a fastener in a first lock down position with said knob having a splined section fitting with a complementary splined section of said valve body to prevent said stem from rotation;
    said fastener being loosenable to allow said knob to axially slide on said stem to an adjustable position which disconnects the splined section of the knob from the splined section of the valve body to allow said knob and stem to rotate to a desired mix position for adjusting temperature of water from said mixing valve.

2. A rotatable handle assembly as defined in claim 1 further characterized by:
    a spring element being interposed between said knob and said valve body to bias said knob to said adjustable position and said fastener when tightened moves said knob against the bias of said spring to said lock down position.

3. A rotatable handle assembly as defined in claim 2 further characterized by:
    said fastener being fastened through a distal axial end of said knob and a distal axial end of said stem.

4. A rotatable handle assembly as defined in claim 3 further characterized by:
    said spline section of said valve body being in a formed female socket section about said stem;
    said spline section of said knob being at a proximate axial end of said knob and surrounding said stem.

5. A rotatable handle assembly as defined in claim 3 further characterized by:
    said fastener being a threaded fastener with a head and an allen wrench receptacle, and said head being recessed mounted in the distal end of said knob.

6. A rotatable handle assembly as defined in claim 3 further characterized by:
    said knob having external handle ribs for facilitating ease of rotation.

7. A rotatable handle assembly as defined in claim 3 further characterized by:
    at least one of said spline sections of said knob and said valve body being chamfered to provide automatic meshing of said spline sections as said knob is moved to the lock down position.

* * * * *